Patented Dec. 22, 1931

1,837,273

UNITED STATES PATENT OFFICE

ANGELO KNORR, OF BERLIN, AND ALBERT WEISSENBORN, OF POTSDAM, GERMANY, ASSIGNORS TO WINTHROP CHEMICAL COMPANY, INC., OF NEW YORK, N. Y., A CORPORATION OF NEW YORK

CYCLIC ACETALS

No Drawing. Application filed February 12, 1930, Serial No. 427,987, and in Germany February 28, 1929.

Our present invention relates to new odoriferous substances and more particularly to cyclic acetals deriving from araliphatic aldehydes.

We have found that the hitherto unknown cyclic acetals of the general formula

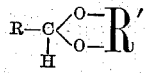

in which R represents an araliphatic hydrocarbon radical of the benzene series and R' stands for an aliphatic hydrocarbon radical have generally a pronounced intensive and very agreeable odor, so that they are very useful in the manufacture of perfumes in contradistinction to the known cyclic acetals deriving from aliphatic aldehydes or benzaldehyde and a bivalent alcohol and possessing only a faint agreeable or even disagreeable odor.

Our new products are obtainable according to the known methods for preparing acetals when starting from an araliphatic aldehyde, such as, for instance, phenylacetaldehyde, hydratropic aldehyde, hydrocinnamic aldehyde, cinnamic aldehyde and from a bivalent alcohol, such as 1.2-dihydroxyethane, a dihydroxybutane, a dihydroxypentane, and so on. The new acetals are in the purified state at ordinary temperature colorless liquids, partly somewhat viscous.

The following examples serve to illustrate our invention:

*Example 1.*—100 parts of 1-oxo-2-phenylethane (phenylacetaldehyde) are introduced drop by drop in the course of 4 hours at 15° C. into 500 to 600 parts of 1.2-dihydroxyethane containing 1 per cent of gaseous hydrogen chloride. Formation and separation of water occurs. After having stirred for some time, the reaction product is washed or directly distilled in a vacuum while recovering unchanged dihydroxyethane. 120 to 130 parts of an acetal are obtained boiling at between 115° C. and 120° C. under 12 mm. pressure. It has a very agreeable fine odor of roses.

*Example 2.*—100 parts of 1-oxo-2-phenylethane (phenylacetaldehyde) are caused to act upon 500 parts of dihydroxypropane as described in Example 1 and there are obtained 140 parts of an acetal boiling at 100° C. under 5 mm. pressure and having an odor of fresh roses.

*Example 3.*—100 parts of 1-oxo-2-phenylethane (phenylacetaldehyde) are caused to react with 500 parts of 1.2-dihydroxybutane according to Example 1 and there are obtained 140 to 150 parts of an acetal boiling at between 107° C. and 110° C. under 5 mm. pressure and having an odor of hyacinths.

*Example 4.*—100 parts of 1-oxo-2-phenylethane (phenylacetaldehyde) are caused to act upon 500 parts of 1.3-dihydroxybutane according to Example 1 and there are obtained 150 parts of an acetal boiling at 133° C. to 135° C. under 14 mm. pressure having an odor of hyacinths.

*Example 5.*—100 parts of 1-oxo-2-phenylethane (phenylacetaldehyde) are caused to act upon 400 parts of 2.4-dihydroxy-4-methylpentane according to Example 1. On distilling in a vacuum there are obtained besides water and 260 parts of unchanged 2.4-dihydroxy-4-methylpentane 200 parts of an acetal boiling at between 110° C. and 115° C. under 5 mm. pressure and having a very agreeable and characteristic odor of mignonette.

*Example 6.*—100 parts of 1-oxo-2-phenyl-2-methylethane (hydratropic aldehyde) are caused to act upon 300 parts of 1.2-dihydroxyethane according to Example 1. There are obtained 140 parts of an acetal boiling at 106° C. to 108° C. under 5 mm. pressure, having a fine and agreeable odor like earth and mushrooms.

*Example 7.*—100 parts of 1-oxo-2-phenyl-2-methylethane (hydratropic aldehyde) are caused to react with 400 parts of 2.4-dihydroxy-4-methylpentane in the manner described in Example 1. There are obtained 150 parts of an acetal boiling at between 115° C. and 120° C. under 5 mm. pressure, having a herbaceous odor of mignonette.

*Example 8.*—100 parts of 1-oxo-3-phenyl-propane (hydrocinnamic aldehyde) are caused to act upon 300 parts of 1.2-dihydroxyethane according to Example 1. There are obtained 110 parts of an acetal boiling at between 115° C. and 120° C. under 5 to 6 mm. pressure and having an odor like flowers and fruits.

*Example 9.*—100 parts of 1-oxo-3-phenyl-propane (hydrocinnamic aldehyde) are caused to act upon 400 parts of 2.4-dihydroxy-4-methylpentane according to Example 1. There are obtained 130 parts of an acetal boiling at 130° C. under 5 mm. pressure and having an odor like flowers and fruits.

*Example 10.*—100 parts of 1-oxo-3-phenyl-propen-2 (cinnamic aldehyde) are caused to act upon 300 parts of 1.2-dihydroxyethane according to Example 1. There are obtained 105 parts of an acetal boiling at between 140° C. and 145° C. under 8 mm. pressure and having an agreeable odor resembling that of oil of cinnamon.

*Example 11.*—100 parts of 1-oxo-3-phenyl-propen (cinnamic aldehyde) are caused to act upon 400 parts of 2.4-dihydroxy-4-methylpentane according to Example 1. There are obtained 160 parts of an acetal boiling at between 155° C. and 160° C. under 5 mm. pressure. It has a soft natural cinnamic odor.

The new cyclic acetals may be worked up to perfumes in the known manner by diluting them with suitable solvents and by adding, if desired, other natural or artificial odoriferous substances.

Numerous other embodiments are possible and we contemplate as included within our invention all such modifications and equivalents as fall within the scope of the appended claims. Other processes known in the art of manufacturing acetals may be used to prepare our new products in an analogous manner.

What we claim is:—

1. As new products the cyclic acetals of the general formula

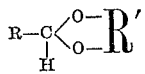

in which R represents an araliphatic hydrocarbon radical of the benzene series and R' stands for an aliphatic hydrocarbon radical, said acetals being at ordinary temperature in the purified state colorless liquids having an intensive and very agreeable odor.

2. As new products the cyclic acetals of the general formula

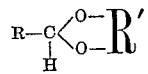

in which R is an araliphatic hydrocarbon radical of the benzene series and R' stands for a pentane hydrocarbon radical, said acetals being at ordinary temperature in the purified state colorless liquids having an intensive and very agreeable odor.

3. As new products the cyclic acetals of the general formula

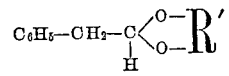

in which R' stands for an aliphatic hydrocarbon radical, said acetals being at ordinary temperature in the purified state colorless liquids having an intensive and very agreeable odor.

4. As new products the cyclic acetals of the general formula

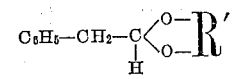

in which R' stands for a pentane hydrocarbon radical, said acetals being at ordinary temperature in the purified state colorless liquids having an intensive and very agreeable odor.

5. As a new product the new cyclic acetal of the formula

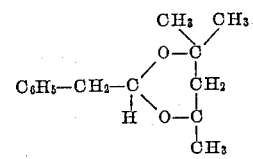

being in the purified state a colorless liquid boiling at about 110° C. to about 150° C. under 5 mm. pressure and having a very agreeable and characteristic odor of mignonette.

6. A perfume containing a cyclic acetal of the general formula

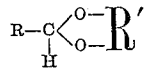

in which R represents an araliphatic hydrocarbon radical of the benzene series and R' stands for an aliphatic hydrocarbon radical.

7. A perfume containing a cyclic acetal of the general formula

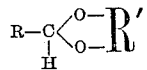

in which R is an araliphatic hydrocarbon radical of the benzene series and R' stands for a pentane hydrocarbon radical.

8. A perfume containing a cyclic acetal of the general formula

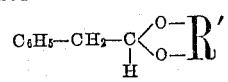

in which R' stands for an aliphatic hydrocarbon radical.

9. A perfume containing a cyclic acetal of the general formula

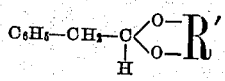

in which R' stands for a pentane hydrocarbon radical.

10. A perfume containing the cyclic acetal of the formula

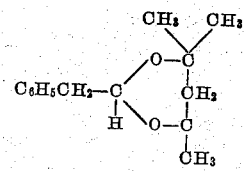

11. The process which comprises acting upon a bivalent aliphatic alcohol with an araliphatic aldehyde of the benzene series in the presence of a condensing agent.

12. The process which comprises acting upon a bivalent aliphatic alcohol with an araliphatic aldehyde of the benzene series in the presence of hydrochloric acid.

In testimony whereof, we affix our signatures.

ANGELO KNORR.
ALBERT WEISSENBORN.